US006115700A

United States Patent [19]
Ferkinhoff et al.

[11] Patent Number: 6,115,700
[45] Date of Patent: Sep. 5, 2000

[54] SYSTEM AND METHOD FOR TRACKING VEHICLES USING RANDOM SEARCH ALGORITHMS

[75] Inventors: David J. Ferkinhoff, Middletown; Sherry E. Hammel, Little Compton; Kai F. Gong, Pawtucket, all of R.I.

[73] Assignee: The United States of America as represented by the Secretary of the Navy, Washington, D.C.

[21] Appl. No.: 08/792,266

[22] Filed: Jan. 31, 1997

[51] Int. Cl.$^7$ ...................................................... G06N 3/12
[52] U.S. Cl. .............................................................. 706/13
[58] Field of Search .............................. 706/13; 382/103; 367/131; 361/131

[56] References Cited

U.S. PATENT DOCUMENTS

| | | | |
|---|---|---|---|
| 5,195,170 | 3/1993 | Eberhardt | 395/24 |
| 5,255,345 | 10/1993 | Shaefer | 706/13 |
| 5,581,657 | 12/1996 | Lyon | 706/13 |

OTHER PUBLICATIONS

L. Davis and M. Steenstrup, "Genetic Algorithms and Simulated Annealing: An Overview," in Genetic Algorithms and Simulated Annealing, Chapter 1, pp. 1–11, Dec. 1987.

J.J. Grefenstette, "Incorporing Problem Specific Knowledge into Genetic Algorithms," in Genetic Algorithms and Simulated Annealing, Chapter 4, pp. 42–60, Dec. 1987.

D.H. Ackley, "Empirical Study of Bit Vector Function Optimization," in Genetic Algorithms and Simulated Annealing, Chapter 13, pp. 171–204, Dec. 1987.

P.P. Mutalik, et al., Solving Combinatorial Optimization Problems Using Parallel Simulated Annealing and Parallel Genetic Algorithms, Proc. 1992 ACM/SIGAPP Symposium on Applied Computing, vol. II, pp. 1031–1038, Dec. 1992.

W.E. Hart, "A Theoretical Comparison of Evolutionary Algorithms and Simulated Annealing," Proc. Fifth Annual Conf. on Evolutionary Programming, pp. 147–154, Feb. 1996.

Davis, L, Genetic Algorithms and Simulated Annealing, Morgan Kaufmann Pub., pp. 1–11, Dec. 1987.

B. Stuckman, et al., "Comparison of Global Search Methods for Design Optimization using Simulation," Proc. 1991 Winter Simulation Conf., pp. 937–944, Dec. 1991.

A. Moilanen, "Parameterization of a metapopulation model: an empirical comparison of several different genetic algorithms, simulated annealing and tabu search," 1995 IEEE Int'l. Conf. on Evolutionary Computation, vol. 2, pp. 551–556, Nov. 1995.

Carrier, J.–Y., "Genetic algorithm for multiple target tracking data association," Proc. of the SPIE, vol. 2739, pp. 180–190, Apr. 1996.

R.A. Iltis and K.L. Anderson, "A Consistent Estimation Criterion for Multisensor Bearings–Only Tracking," IEEE Trans. on Aerospace and Electronic Systems, vol. 32(1), pp. 108–120, Jan. 1996.

F. Liu, et al., "Multisensor data fusion based on genetic algorithm," Proc. SPIE—The Int'l. Society for Optical Engineering, vol. 2898, pp. 43–48, Nov. 1996.

(List continued on next page.)

*Primary Examiner*—Tariq R. Hafiz
*Assistant Examiner*—Michael Pender
*Attorney, Agent, or Firm*—Michael J. McGowan; Michael F. Oglo; Prithvi C. Lall

[57] ABSTRACT

The present invention relates to a method and a system for providing an estimate of the state of a contact. The method includes the steps of sensing the state of the contact; generating signals representative of the state of the contact; and processing the signals using a random search procedure to arrive at an estimate of the state of the contact. The random search procedure may employ the simulated annealing-based algorithm methodology or the genetic-based algorithm methodologies. The system includes sensors for sensing the state of the contact and a preprogrammed computer for generating the desired contact state estimates.

11 Claims, 7 Drawing Sheets

OTHER PUBLICATIONS

D. Ferkinhoff et al., "An Efficient Genetic Algorithm for Contact Tracking", 5 Proc. of the Artificial Neural Networks in Engineering Conf. on Fuzzy Logic and Evolutionary Programming 387–92 (1995).

D.J. Ferkinhoff et al., "Applying Random Search Algorithms to Target Motion Analysi", Naval Undersea Warfare Center Div. Technical Report NUWC–NPT–TR–10–472 (1996).

D.J. Ferkinhoff et al., "Performance Characterization of Artificial Neural Networks for Contact Tracking", 2 Proceedings of Oceans '93 Conference (1993).

S.E. Hammel et al., "Recursive Versus Batch Processing Algorithms for Bearings–Only Tracking" 1 Proc. of the Oceans '83 Conf. on Effective Use of the Sea: An Update 50–61 (1983).

SYSTEM AND METHOD FOR TRACKING VEHICLES USING RANDOM SEARCH ALGORITHMS

CROSS REFERENCES TO RELATED PATENT APPLICATIONS

The instant application is related to co-pending U.S. patent application Ser. No. 08/747,469, filed Nov. 12, 1996 of D. J. Ferkinhoff and J. G. Baylog entitled METHOD AND APPARATUS FOR PERFORMING MUTATION IN A GENETIC ALGORITHM-BASED UNDERWATER TARGET TRACKING SYSTEM (Navy Case No. 77851).

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The present invention relates to a system and a method for tracking vehicles using random search algorithm methodologies.

(2) Description of the Prior Art

Contact tracking encompasses processing data from various sensors to provide an estimate of a contact's position and velocity, or state. Under favorable noise, geometric and environmental conditions, or highly observable conditions, reliable unique estimates of the target state can be obtained. However, most practical situations do not conform to these conditions, which in conjunction with the inherent uncertainty in selecting appropriate mathematical models, can cause instability in the estimation process. In addition, the relationship between the contact state and the observed measurements is nonlinear. Therefore, any linearization procedures applied can introduce additional estimation errors. Under these conditions, alternative algorithms for finding peaks in these multi-dimensional function to provide efficient and reliable estimates are desired.

Variable gradient-based estimation techniques, such as Kalman filters or maximum likelihood estimators, are available to provide tracking estimates by searching for the peak of the target state density function. However, these techniques employ a search procedure based on the local gradient of the density function, which can lead to convergence to local maxima. Another potential problem associated with these algorithms is that they can diverge when the problem becomes ill-conditioned, such as when the measurements are very noisy or the data is sparse and intermittent. These conditions are especially prevalent when tracking with active or passive data in a shallow water environment.

Because of their processing stability, grid-based techniques have recently been applied to the target state estimation problem. Unlike their gradient-based counterparts, these techniques estimate the unknown contact parameters by direct reconstruction of the state density function. In this process, a grid of predetermined size and resolution is typically used, and the value of the density function is computed at all grid points. In principle, this computationally expensive technique can provide the desired efficacy, however, its shortcoming is a lack of efficiency. In addition, the grid must be properly placed, and the resolution and size must be appropriately selected in order to properly represent the contact state density.

Recently, efforts have been made to generate better solutions for problem solving through the use of genetic algorithm methodologies for finding peaks in non-linear functions. U.S. Pat. No. 5,148,513 to Koza et al., for example, relates to a non-linear genetic process for problem solving using co-evolving populations of entities. The iterative process described therein operates on a plurality of populations of problem solving entities. First, an activated entity in one of the plurality of populations performs, producing a result. The result is assigned a value and the value is associated with the producing entity. The value assigned is computed relative ti the performance of the entity in a population different from the evolving population. Next, entities having relatively high associated values are selected from the evolving population. Th selected entities perform either crossover or fitness proportionate reproduction. In addition, other operations such as mutation, permutation, define building blocks and editing may be used. Next, the newly created entities are added to the evolving population. Finally, one of the environmental populations switches roles with the evolving population and the process repeats for the new evolving population and the new environmental populations.

U.S. Pat. Nos. 5,222,192 and 5,255,345, both to Shaefer, relate to optimization techniques using genetic algorithm methodologies. The optimization method described therein finds the best solution to a problem of the kind for which there is a space of possible solutions. In the method, tokens take on values that represent trial solutions in accordance with a representational scheme that defines the relationships between given token values and corresponding trial solutions. By an iterative process, the values of the tokens are changed to explore the solution space and to converge on the best solution. For at least some iterations, characteristics of the tokens and/or the trial solutions are analyzed and the representational scheme for later iterations is modified based on the analysis for earlier iterations without interrupting the succession of iterations. In another aspect, a set of operators is made available to enable a user to implement any of at least two different algorithms.

U.S. Pat. No. 5,343,554 to Koza et al. relates to an apparatus and method for solving problems using automatic function definitions, for solving problems using recursion, and for performing data encoding. The apparatus and method create a population and then evolve that population to generate a result. When solving problems using automatic function definition, the Koza et al. apparatus and method initially create a population of entities. Each of the entities has sub-entities of internally and externally invoked sub-entities. The externally invoked sub-entities are capable of having actions, invocations of sub-entities which are invoked internally, and material. Also, each sub-entity which is invoked internally is capable of including actions, invocations of internally invocable sub-entities, material provided to the externally invocable sub-entity, and material. The population is then evolved to generate a solution to the problem. When using the process to solve problems using recursion, the entities in the population are constructed in such a manner as to explicitly represent the termination predicate, the base case and the non-base case of the recursion. Each entity has access to a name denoting that entity so as to allow recursive references. The population is then evolved to generate a solution to the problem. When encoding a set of data values into a procedure capable of approximating those data values, the apparatus and process initially create a population of entities. The population is then evolved to generate a solution to the problem.

U.S. Pat. No. 5,394,509 to Winston relates to a data processing system and method for search for improved results from the process which utilizes genetic learning and optimization processes. The process is controlled according to a trial set of parameters. Trial sets are selected on the basis of an overall ranking based on results of the process as performed with a trial set. The ranking may be based on quality, or on a combination of rankings based on both quality and diversity. The data processing system and method described therein are applicable to manufacturing processes, database search processes and the design of products.

State estimation algorithms typically used in target motion analysis systems typically employ models of platform kinematics, the environment, and sensors. The contact or target is assumed to be of constant velocity, while the ship which is observing the target, the own ship, is free to maneuver. Further, straight line signal propagation is assumed.

The contact state parameters for position and velocity have components $X_j$ defined as:

$$X_j \in [R_{XT}(t_o), R_{YT}(t_o), V_{XT}, V_{YT}], \quad (1a)$$

where $R_{XT}(t_o)$ and $R_{YT}(t_o)$ are the Cartesian position components at time $t_o$, and $V_{XT}$ and $V_{YT}$ are the corresponding velocity components. Thus, the target state vector $X_T$ is defined as:

$$X_T = [R_{XT}(t_o) R_{YT}(t_o) V_{XT} V_{YT}]^T. \quad (1b)$$

The observer state is similarly defined as:

$$X_O = [R_{XO}(t_o), R_{YO}(t_o), V_{XO}, V_{YO}]^T. \quad (1c)$$

The contact state relative to the observer is defined as $$X(t_o) = X_T - X_O = [R_X(t_o), R_Y(t_o), V_X, V_Y]^T, \quad (1d)$$

where $R_X(t_o)$ and $R_Y(t_o)$ are the relative Cartesian position components at time $t_o$, and $V_X$ and $V_Y$ are the relative velocity components. If $t_i$ is the $i^{th}$ sampling time, the state dynamic equations are governed by the equation:

$$X(t_{i+1}) = \Phi(t_{i+1}, t_i) X(t_i) + u(t_i), \quad (2a)$$

where $\Phi(t_{i+1}, t_i)$ is the state transition matrix defined as $$\Phi(t_{i+1}, t_i) = \begin{bmatrix} I_{2\times 2} & (t_{i+1} - t_i) I_{2\times 2} \\ 0 & I_{2\times 2} \end{bmatrix} \quad (2b)$$

with $I_{2\times 2}$ being a two dimensional square identity matrix and $u(t_i)$ is a vector relating to ownship acceleration at time $t_i$. The measurement vector Z is defined by the equation $$Z = H(X) + \eta, \quad (3a)$$

where $H(X)$ is a nonlinear function relating Z to the state X; that is, with $\beta_i$ defined as an angular measurement and $R_i$ defined as a range measurement, $$H(x) = \begin{bmatrix} \beta_0 \\ \vdots \\ \beta_m \\ R_0 \\ \vdots \\ R_m \end{bmatrix} = \begin{bmatrix} \operatorname{atan} \frac{R_X(t_0)}{R_Y(t_0)} \\ \vdots \\ \operatorname{atan} \frac{R_X(t_m)}{R_Y(t_0)} \\ \sqrt{R_X(t_0)^2 + R_y(t_0)^2} \\ \vdots \\ \sqrt{R_X(t_m)^2 + R_y(t_m)^2} \end{bmatrix} \quad (4)$$

and $\eta$ is the white Gaussian noise vector defined as:

$$\eta = [\eta_{\beta 0} \eta_{\beta 1} \ldots \eta_{\beta m} \eta_{R0} \eta_{R1} \ldots \eta_{Rm}]^T, \quad (5a)$$

with mean and covariance $$E[\eta] = 0, \quad (5b)$$

$$E[\eta \eta^T] = W = \begin{bmatrix} \sigma_{\beta o}^2 & & & & & \\ & \ddots & & & 0 & \\ & & \sigma_{\beta m}^2 & & & \\ & & & \sigma_{R0}^2 & & \\ & 0 & & & \ddots & \\ & & & & & \sigma_{Rm}^2 \end{bmatrix} \quad (5c)$$

Determining the maximum likelihood estimate (MLE) is equivalent to finding the X that minimizes the cost function $\|Z - H(\hat{X})\|$; i.e., $$\hat{X}_{MLE} = \min_{\hat{X}} \left[ \left\| Z - H(\hat{X}) \right\|_w^2 - 1 \right] \quad (6)$$

Performing the above operation yields $$\hat{X} = [\Phi^T J^T W^{-1} J \Phi]^{-1} \Phi^T J^T W^{-1} Z, \quad (7)$$

where $$J = \left. \frac{\partial H(X)}{\partial X} \right|_{X = \hat{X}}, \quad (8)$$

is the Jacobean.

The term $[\Phi^T J^T W^{-1} J \Phi]$ in equation 7 is the Fisher Information Matrix (FIM) which must be nonsingular for X to be uniquely determined from the data. Because this is a gradient-based technique, the cost function and its derivative must be continuous. Inherent to the problem formulation are assumed system models. However, in many situations the models may not be known exactly. Traditional methods of solving the nonlinear tracking problem are sensitive to noise and geometric conditions, as well as modeling, linearization and initialization errors. These sources of error can cause problems by injecting errors in the computation of J and thus the FIM. As such these methods may be prone to ill-conditioning and instability.

For this reason, there still remains a need for more efficient systems and methods for estimating the motion of a target.

SUMMARY OF THE INVENTION

Accordingly, it is an object of the present invention to provide a method for solving contact tracking problems and providing an estimate of the state of the contact which is more efficient than methods heretofor available.

It is a further object of the present invention to provide a method as above which solves contact tracking problems under poor observability and/or multimodal conditions.

It is yet another object of the present invention to provide a system which solves contact tracking problems more efficently than systems heretofor available.

The foregoing objects are attained by the method and the system of the present invention.

In accordance with the present invention, a method for providing an estimate of the state of the contact broadly comprises: sensing the state of the contact; generating signals representative of the state of the contact; and processing the signals to arrive at an estimate of the state of the contact. The processing step comprises using a random search type algorithm methodology to generate said contact state estimate. The random search algorithm may be a simulated annealing based type of algorithm or a genetic-based type of algorithm.

The system of the present invention comprises means for sensing the motion of a contact and generating signals representative of the state of the contact and means for processing the signals to arrive at an estimate of the state of the contact, which processing means comprises pre-programmed means for applying a random search algorithm to said signals.

Further details of the method and system of the present invention, as well as other objects and advantages attendant thereto, are set forth in the following description and drawings, in which like reference numerals depict like elements.

DETAILED DESCRIPTION OF THE PREFERRED EMBODIMENT(S)

Figure 1:
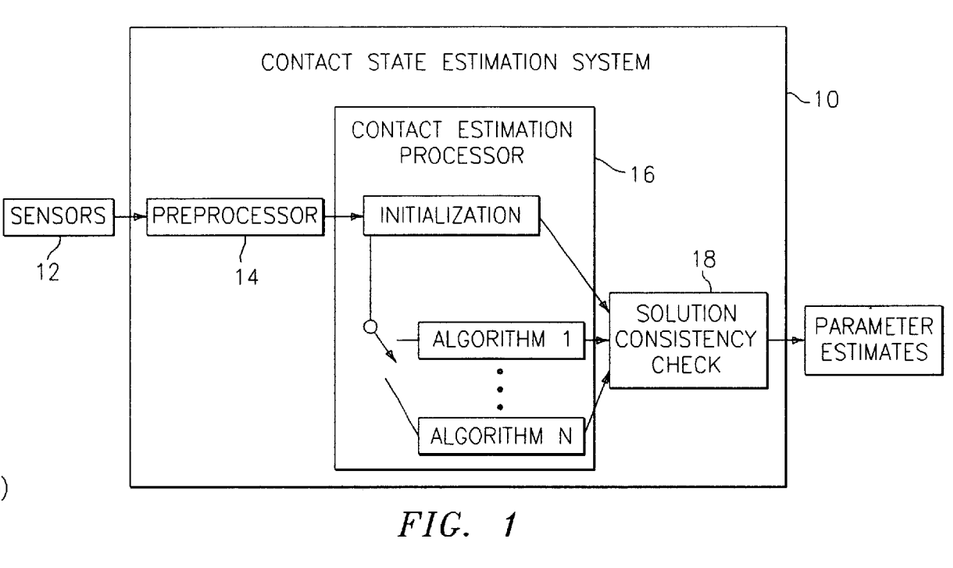
FIG. 1 is a schematic representation of a contact state estimation system.

Referring now to the drawings, FIG. 1 illustrates a system for estimating the state of a target or contact. As shown therein, the system 10 includes a set of sensors 12 whose measurements contain the information necessary to determine the contact state parameters. In systems which are used to track waterborne vessels (including acoustic contacts with submarines and torpedoes), the sensors 12 typically comprise one or more sonar devices for generating signals representative of the state of the contact or target.

In such systems, the surrounding water environment, such as the ocean, can be quite noisy. Thus, the signals generated by the sensors 12 are processed by a preprocessor 14 which may comprise any suitable pre-programmed computing device known in the art. In the preprocessor 14, the measurement signals generated by the sensors 12 may be edited, associated, pre-whitened and/or segmented using known techniques. Thereafter, the preprocessed signals are transmitted to a pre-programmed target estimation processor 16 for providing estimates of contact state parameters such as range, bearing, speed and course. The processor 16 may comprise any suitable pre-programmed computer known in the art, and typically will be of the parallel processing type of computer. The contact state estimates are evaluated for accuracy and statistical consistency using a solution consistency check system 18. The check system looks at the residuals or features in the residuals to determine if an appropriate set of parameter estimates have been reached. For example, if appropriate models of the physical processes which generated the sonar measurements are employed, and an efficient estimate of the contact's state parameters is achieved, then the residuals would appear simply as an unbiased white Gaussian noise sequence. However, if the modeling assumptions about the physical processes, which include contact kinematics, environmental and sensor models, are inappropriate, and/or the estimate of the contact's state parameters is inefficient, then biases could be evident in the residual sequence. These biases can be characterized in terms of deterministic features, thus, the absence of features in the residuals would be an appropriate check for consistency of the modeling assumptions and the efficiency of the contact state parameter estimate. A suitable check system is described in U.S. Pat. No. 5,373,456 to Ferkinhoff et al. which is incorporated by reference herein and which system has been extended in U.S. Pat. No. 5,581,490, which is also hereby incorporated by reference herein.

In principle, a combination of algorithms can be preprogrammed into the processor 16 to provide a desired efficiency and efficacy. For example, appropriate algorithms can be selected based on data type, trends observed in the data, system observability, or environmental conditions. Preferably, a selected algorithm is used to provide an initial estimate of the contact state parameters to another algorithm or algorithms for refinement. In some target localization systems, a mode of determining a probabilistic minimum "cost" or "penalty" is employed to provide target motion analysis solutions. The cost or penalty function is a mathematical expression representing al possible solution states. A gradient descent process searches the mathematical expression to determine the state having minimum cost or penalty. This minimum cost becomes the score for the solution, and if it is low enough, the system uses the corresponding state parameters to provide an estimate of the localization of the target. The present invention has particular utility in such a gradient descent search process.

The system and the method of the present invention involves the application of random search methodologies or techniques to contact tracking. Specifically, the processor 16 is programmed to use a simulated annealing-based algorithm methodology or a genetic-based algorithm methodology as a search mechanism for the contact state estimation problem. The principal advantage of both of these random search algorithms is that they do not use gradients and are more efficient than grid-based algorithms. They have been found to be particularly useful in solving contact tracking problems under poor observability and/or multimodal conditions.

Simulated annealing-based algorithm searching or estimating takes its name from a mechanical process known as annealing. In this process a metal, or combination of metals, are first heated and then cooled at a particular rate. The cooling rate is controlled by a temperature schedule appropriate to allow the metallic crystals to form in the desired manner. This process provides the desired characteristics of the final product by minimizing the internal stresses or energy. Simulated annealing as used for contact tracking, mimics this phenomenon. Specifically, the simulated annealing technique involves finding a state that minimizes the cost function, or equivalently maximizes the contact state density, via the annealing process. Finding this target contact state is analogous to what goes on in an annealing process, namely arranging the atomic state of the metal such that the internal energy of the metal is minimized, by iteratively adjusting temperature schedules. The cost function used here is the RMS value of the residuals which is the $Z-H(\hat{X})$ component used in equation 6.

For a tracking problem, the estimation process via simulated annealing starts with a random guess $X_o$ as to the state of the contact; although some deterministic knowledge can be employed. The desired contact state estimation solution is obtained iteratively where the estimate at the $k+1^{th}$ iteration is computed by adding a small random perturbation, $\Delta X$, to the $k^{th}$ estimate; that is, $$\hat{X}_{k+1} = \hat{X}_k + \Delta X, \tag{9a}$$

where $$\Delta X = \begin{bmatrix} N(0, \Delta_{Rx}^2) \\ N(0, \Delta_{Ry}^2) \\ N(0, \Delta_{Vx}^2) \\ N(0, \Delta_{Vy}^2) \end{bmatrix} \tag{9b}$$

and $N(0,\Delta^2_{(.)})$ is a white Gaussian distributed random variable with zero mean and variances $\Delta^2_{(.)}$ for the (.) parameter. It should be noted that no gradient information is used in computing $\Delta X$ and that the present technique does not require the cost function to be continuous. The change in the cost, or energy, is computed via $$\Delta E = E_{k+1}(X) - E_k(X), \tag{10}$$

where $$E_k(X) = \|Z - H(X)\|^2_w - 1|\hat{X}_k \tag{11}$$

If $\Delta E$ is less than zero, indicating a search in the direction of minimum energy, $\hat{X}_{k+1}$ is accepted; otherwise, the probability of accepting $\hat{X}_{k+1}$, defined as $\tau(\hat{X}_{k+1})$, is computed using the following equation:

$$\tau(\hat{X}_{k+1}) = \exp - \Delta \frac{E}{T_j}, \tag{12}$$

where $T_j$ is the temperature at the $j^{th}$ temperature iteration. To give the algorithm an ability to settle somewhat at the $j^{th}$ temperature, the temperature is only updated every $I_T$ perturbations of the contact state estimate, where $I_T$ is chosen to be a small value, e.g., less than 10. For a tracking problem the temperature schedule may be selected as:

$$T_j = \alpha j T_o, \tag{13}$$

where $T_o$ is the initial temperature and $\alpha$ is a constant less than unity. A minimum value for $T_j$ is also specified. Equation 13 is determined empirically since standards for optimal temperature selection for this problem do not exist.

The decision to accept $\hat{X}_{k+1}$ as the new estimate when $\Delta E$ is positive is made by comparing $\tau(\hat{X}_{k+1})$ to a random number generated from a uniform distribution between zero and one. That is to accept $\hat{X}_{k+1}$ if $$\tau(\hat{X}_{k+1}) > U[0,1]; \tag{14a}$$

otherwise, $$\hat{X}_{k+1} = \hat{X}_k. \tag{14b}$$

Figure 2:
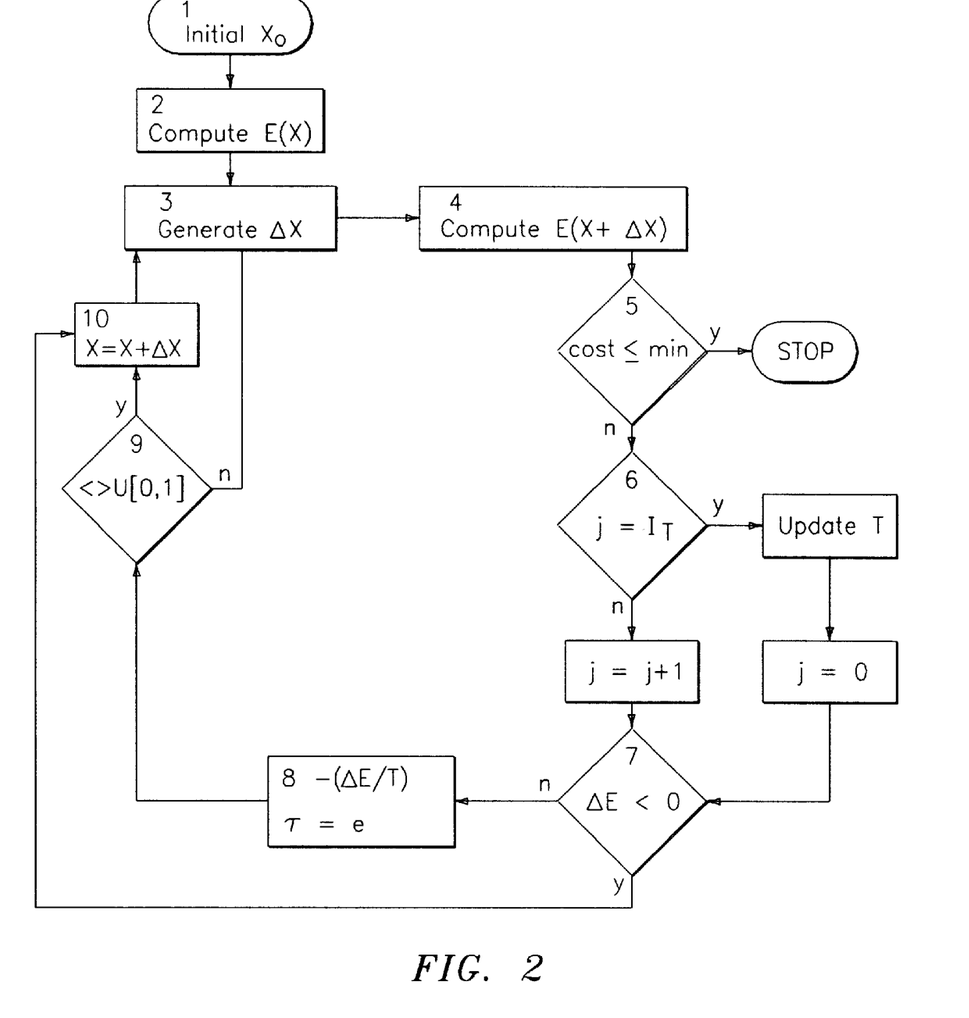
FIG. 2 is a flow chart of a method for contact state estimation using a simulated annealing-based algorithm methodology.

The entire procedure is iterated until a pre-specified convergence criterion is satisfied. The convergence criterion employed in solving tracking problems includes the use of a minimum cost, a maximum number of iterations, and a minimum change in the contact state estimate. The estimation process employing the simulated annealing-based algorithm methodology search is shown in FIG. 2 in which the box numbers correspond to the step numbers of Table I. If the algorithm is determined to have prematurely converged, it can be reinitialized at a different initial estimate, where the maximum number of re-annealings is specified. The simulated annealing target tracking algorithm is summarized in Table I.

TABLE I

| | |
|---|---|
| 1: Make a random guess for the initial target state. | 2: Compute the energy of the target state estimate. |
| 3: Randomly generate a small change in the target state estimate. | 4: Compute the energy (cost) of the new target state estimate. |
| 5: Check new cost against stopping criteria, if stopping criteria is met STOP, otherwise go to step 6. | 6: If enough iterations have been performed since the last temperature update, change the temperature, otherwise increment the temperature counter. |
| 7: Determine if change in energy is negative, if so accept change in target state and go to step 10, if not go to step 8. | 8: Compute probability of accepting the new target state. |
| 9: Compare the probability to a random threshold, if the probability exceeds the threshold go to step 10, otherwise go to step 3. | 10: Update the target state estimate. Go to step 3. |

The stopping criteria may be some predetermined value for minimum cost, a maximum number of iterations, the change in energy (cost) is not great, or the most recent change in cost does not decrease the cost.

It should be noted that the design of the algorithm provides the following properties. With a sufficiently high simulated annealing temperature, any change in the contact state estimate regardless of change in cost, will have a high probability of being accepted. Here it is assumed that the change in contact state is in fact moving towards the minimum cost, even though th cost may have increased for this iteration. As the simulated annealing temperature decreases, the probability of accepting the changes in the estimate which cause large increases in cost also decreases. This mechanism allows the estimate to move out of local minima while maintaining the search towards the minimum cost. For example, when the temperature is infinite all changes in the estimate are accepted, while for zero temperature only changes that decrease the cost are accepted. Intermediate temperatures change the probability of accepting those changes in the contact state estimate with increased cost where the probability is a function of the change in cost and the temperature.

It has been found that the genetic-based methodology for searching or estimating algorithm may also be used to obtain improved contact state estimate results. The term "genetic algorithm" takes its name from the study of genetics in biology where the rule in nature is survival of the fittest. In this process, individuals in the population with the best genes for the local environment have a better chance of surviving to produce offspring, thus passing their genes to the next generation. Here, a global environment can have several local environments, each of which have an associated set of appropriate genes. For instance, a given geographic area can have a forested area which supports browsers, while a nearby plain can support grazers. The phenomenon in which different gene sequences are more appropriate for the different local environments is known a niche sharing. The genetic method of propagating genes to subsequent populations is through the use of three probalistic mechanisms: parent selection, which allows the best individuals from the current population to have a higher probability of being selected; crossover, or mating, which forms new genes by combining sequences from the parents and passes the new genes along to the children; and mutation, which helps to prevent loss of genetic information.

Adapting genetic algorithms for contact tracking mimics the survival of the fittest rule by defining a binary coding of the contact state variables, and operating on the bits in the same manner as genes are in biology. For the state estimation problem, the process of determining which genes are best suited for the local environments is equivalent to finding the maxima in a multi-modal density function. Thus, the problem becomes one of finding the bit sequences which, after converting to real numbers, determine the locations of the various maxima in the contact state density function, or equivalently the minima in the cost function. The parent selection, crossover, and mutation mechanisms as applied to the tracking problem are as follows.

Parent selection is a probalistic method for selecting the best-fit individuals, or samples, from a population of size P for mating. Each sample of the population has an associated fitness or performance value, perf ($\hat{X}_i$). Without loss of generality, let $$perf(\hat{X}_i) = \frac{1}{\|Z - H(X)\|^2_{w-1} - 1}\bigg|_{x=\hat{x}i} \quad i = 1, 2, \ldots, p. \quad (15)$$

In the parent selection process, stochastic errors in sampling caused by small P can lead to excessive self replication by high performance samples. This can result in a clustering of these samples about one maximum of the state density function, or local environment. For the tracking problem, many situations warrant finding all maxima in the state density function. Thus, a mechanism similar to the one which produces niche sharing must be used to distribute samples among other peaks in the state density function, and care must be taken to select a large enough population size to facilitate niche sharing.

For the application considered here, niche sharing is facilitated by scaling the performance values relative to the distance among all samples in the population. Specifically, let the sum of the Euclidean distances from the $k^{th}$ sample to all others be defined as $$D(\hat{X}_k) = \sum_{i=1}^{P} \|\hat{X}_k - \hat{X}_i\|^2 \Omega_k, \quad (16)$$

where $\Omega_k$ is a weighting vector $$\Omega_k = \begin{bmatrix} \tilde{\omega}_{R_{xk}} \\ \tilde{\omega}_{R_{yk}} \\ \tilde{\omega}_{V_{xk}} \\ \tilde{\omega}_{V_{yk}} \end{bmatrix} \quad (17)$$

For $d \in \{R_X, R_Y, V_X, V_Y\}$, with corresponding maximum $d_{max}$ and minimum $d_{min}$, the components for the weighting vector in the $k^{th}$ sample are defined as $$\tilde{\omega}_{dk} = \left\{1.0 + 1.9 \left[\hat{d} - \frac{d_{max} - d_{min}}{2.0}\right]\right\}^{-1} \quad (18)$$

The performance function can now be scaled by $D(X_k)$ as $$pf1(\hat{X}_k) = D(\hat{X}_k) \, perf(\hat{X}_k), \quad (19a)$$

which is subsequently normalized to reflect the probability of selection as $$pf(\hat{X}_k) = \frac{pfl(\hat{X}_k)}{\sum_{i=1}^{P} pfl(\hat{X}_i)} \quad k = 1, 2, \ldots, P. \tag{19b}$$

Figure 3:
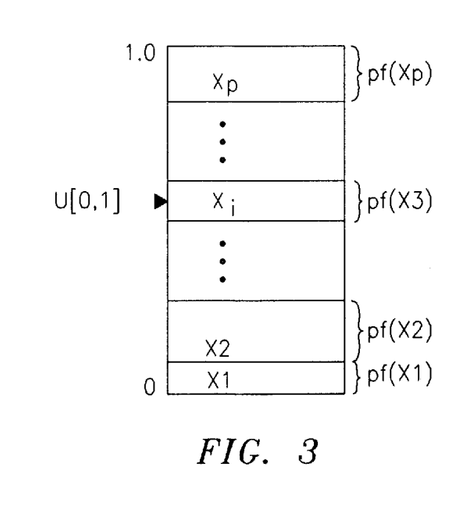
FIG. 3 is an illustration of a parent selection technique.

Parent selection can now be performed P times, i.e., select $X_L$ if $$\min_{L}\left[\sum_{i=1}^{L} pf(\hat{X}_i)\right] > U[0, 1], \tag{20}$$

where U[0,1] is a random number obtained from a uniform distribution between zero and one. The parent selection process is illustrated in FIG. 3.

Figure 4:
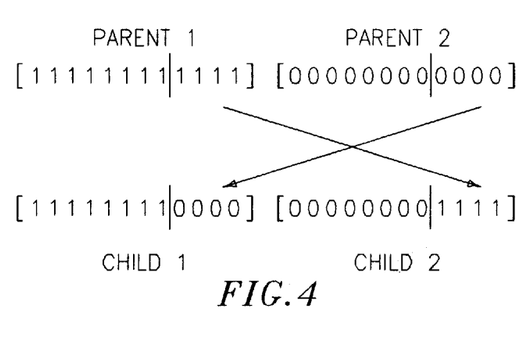
FIG. 4 is an illustration of a crossover technique.

Once two parents are selected, crossover is performed based on a prespecified probability. The combination of parent selection and crossover is the major search mechanism of the algorithm; therefore, the probability of crossover is typically greater than 90%. If crossover is not performed, the parents are copied as is to the child population. When crossover is performed, a crossover site is first randomly chosen in the bit string, where the same crossover site is used for both parents to preserve the length of the bit strings. The two sub-strings located after the crossover site for the two parents are exchanged to create two new strings, or children.

Multiple crossing sites can also be used, in which case every other sub-string is exchanged. Note that using more crossing sites will scramble the longer gene sequences, while using fewer crossing sites will result in fewer combinations of genes. Thus, the desired stability of the gene sequences should be taken into account when determining the number of crossing sites. The crossover procedure is illustrated in FIG. 4 for a single crossing site where there are 12 bits making up the parents, and the crossing site was chosen to cut the string between the 8th and 9th bits.

For the problem at hand, the number of crossover sites is initially relatively large, and is decreased in steps when the current number of generations equals multiples of one quarter of the maximum number of generations. This allows the algorithm to form short bit sequences in early generations, while subsequently allowing longer bit strings to form with a higher probability of surviving to subsequent generations.

Once all crossover operations are completed, several options are available for handling the disposition of the children. Depending on the user preference, they can be accumulated until an arbitrary number of children are produced at which time they replace the current population, or they can immediately be added to the current population thus increasing the size of the population.

A mutation operator is included to preserve genetic information; that is, if important genetic information is bred out of the population, a mutation of the genes can reintroduce this information. Mutation is performed randomly as follows. For all samples, starting at the first bit, a uniformly distributed random number is compared to a threshold. If the random number exceeds the threshold, the bit is complemented; i.e., for the $i^{th}$ bit and mutation threshold $v_m$, $$b_i = \overline{b_i} \text{ if } (v_m < U[0, 1]). \tag{21}$$

Figure 5:
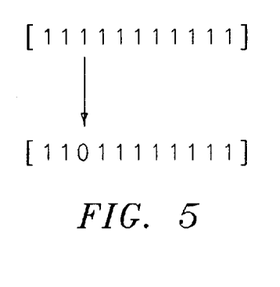
FIG. 5 is an illustration of a mutation.

Regardless of the outcome the same procedure is applied until al bits in the population are operated on in this manner. The following example illustrates the utility of the mutation operator, if a zero was needed in the third position in the bit string to achieve high performance, or minimize the cost, but all bit sequences contained a one in this position, no combination of the parent selection or crossover operators would be sufficient to solve the problem. Therefore, a mutation would be required to complement this bit. An illustration of a mutation is shown in FIG. 5 where the third bit is mutated. The above identified co-pending application of D. J. Ferkinhoff and J. G. Baylog entitled "Method and Apparatus for Performing Mutations in a Genetic Algorithm-Based Underwater Target Tracking System" (Navy Case No. 77851) discloses a process and apparatus for performing mutations in connection with gentics-based algorithms for searching for peaks in functions having one or more degrees of dimensionality which is especially efficient in its utilization of compilation resources, and hence of special utility in the presently described underwater acoustic contact localization system wherein the available measure of computation resources constitute a critical factor in system design. This co-pending application is hereby incorporated herein by reference, in its entirety.

It should be noted that a high probability of mutation effectively destroys the bit sequences, yielding an inefficient search mechanism. For this reason, to allow the bit strings to stabilize, the probability of mutation is typically less than 10%, and is adjusted in a manner similar to changing the number of crossover sites.

In applying genetic algorithms to a target tracking problem a binary representation of the state parameters is used, and the search procedure to minimize the cost is performed iteratively. Each member of the population corresponds to a sample of the state space. Initially, a number of population samples are generated, preferably about 30 samples. The samples are uniformly distributed in the state space. Let $k_j$ represent the number of bits for the $j^{th}$ component of the state vector, defined in equation (1a). Thus, for the $i^{th}$ sample, $$\begin{bmatrix} RxT_{bi} \\ RyT_{bi} \\ VxT_{bi} \\ VyT_{bi} \end{bmatrix} = \begin{bmatrix} b_{0_{Rxi}} & b_{1_{Rxi}} & \cdots & b_{k_{Rxi}} \\ b_{0_{Ryi}} & b_{1_{Ryi}} & \cdots & b_{k_{Ryi}} \\ b_{0_{Vxi}} & b_{1_{Vxi}} & \cdots & b_{k_{Vxi}} \\ b_{0_{Vyi}} & b_{1_{Vyi}} & \cdots & b_{k_{Vyi}} \end{bmatrix} \tag{22}$$

where an unsigned coding scheme was chosen here. Thus, $b0_j$ is the most significant bit, $bk_j$ is the least significant bit, and the sign information is taken care of when converting to real numbers. The binary representation of the target state is then constructed by concatenating the binary representation of the state variables into a single binary sequence as $$XT_{bi} = [RxT_{bi} \; RyT_{bi} \; VxT_{bi} \; VyT_{bi}]. \tag{23}$$

The algorithm is first initialized by randomly distributing ones and zeros in the binary target state strings, $X_{Tbi}$, for all samples in the population, where the probability of any bit being a one is 50% and is independent of the other bits in the population. Let the performance function be defined as in equations (15) through (19).

The parent selection, crossover and mutation operations are subsequently applied in an iterative manner to find the maxima in the performance function, which is equivalent to solving equation (6). For each iteration, or generation, the performance is computed for each sample. Parent selection and crossover are next performed P/2 times. This generates P new samples which replace the parent population. Mutation is performed and the performance of those few samples that were mutated is computed. This process continues until stopping criteria are met. These criteria can include: a maximum number of generations is reached, a maximum performance value (minimum cost) is reached, or the population is determined to have stabilized. The genetic algorithm target tracking algorithm is summarized in Table II.

TABLE II

| | | | |
|---|---|---|---|
| 1: | Generate P randomly distributed samples of the target state space. | 2: | Compute the cost for all samples in the population. |
| 3: | compare the cost of all samples to a threshold, if the cost of any one is less than the threshold STOP, otherwise go to step 4. | 4: | Compute the weighted and normalized performance values for all samples. |
| 5: | Select parents for crossover. | 6: | Perform crossover for the pairs produced in step 5. |
| 7: | Compute the cost of all samples in the new generation. | 8: | Compare the cost of the new samples to a threshold, if the cost of any one is below the threshold STOP, otherwise go to step 9. |
| 9: | Compute weighted and normalized performance for the new samples. | 10: | Replace original population. |
| 11: | Perform mutation. | 12: | Go to step 2. |

Figure 6:
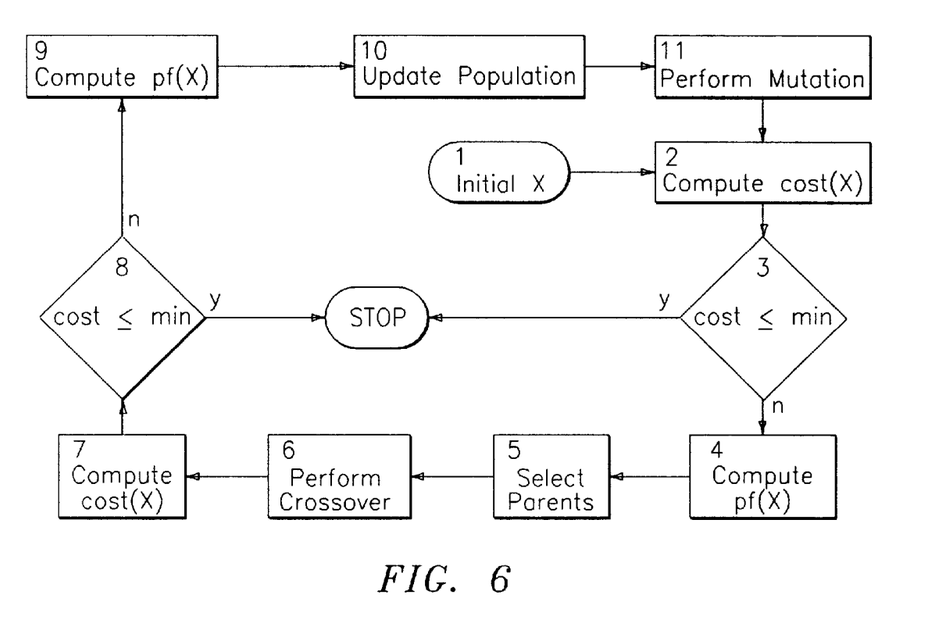
FIG. 6 is a flow chart of a process for contact state estimation using a genetic-based algorithm methodology.

The estimation process employing genetic algorithms is illustrated in FIG. 6 in which the box numbers correspond to the step numbers of Table II. It should be noted that while FIG. 6 shows the cost is computed twice for the population in every generation, only a few samples get changed by mutation so the cost only needs to be computed for those few.

While the application of genetic algorithms to estimate target state parameters is similar to a grid-based search in that it searches from a sampling of the target state space, it has been theoretically determined that the genetic algorithm searches an equivalent of $n^3$ data points, where n is the total number of points in the state space the algorithm visits. This is because the algorithm concentrates its search more in the areas of maxima that it finds; i.e., it is as if the resolution of a nonuniform grid is dependent upon the value of the density function at the grid points.

To facilitate computational efficiency in subsequent stages of the target tracking system, the weighted centroids of K clusters are computed from the P final solutions, with k defined as the desired maximum number of clusters. The centroids are computed using the performance values as weights. The centroid of the $q^{th}$ cluster is computed by first determining the euclidean distance between all samples as $$D_c(\hat{X}_i, \hat{X}_j) = \|\hat{X}_i - \hat{X}_j\|^2 \; i=1,2,\ldots Pj=1,2,\ldots Pj \neq i. \quad (24)$$

Starting at the closest pair, i.e, min $[D_c(\hat{X}_i,\hat{X}_j)]$, the distance of the sample and the next closest distance to the current cluster is compared. If the distance to the next sample is greater than a specified percentage of the previous distance, start a new cluster; otherwise add this sample to the current cluster and search for the sample with the next closest distance to the current cluster. This procedure is iterated until all samples are assigned to clusters. If the number of clusters at any point exceeds K, the specified percent range in the distance allowed between samples within a cluster is relaxed and the algorithm starts again. Once the clusters are formed, the centroids of all clusters are computed as follows. the centroid for the $q^{th}$ cluster, $\hat{X}_q$, is computed as $$\hat{X}_q = \frac{1.0}{N_q} \sum_{i=1}^{N_q} \hat{X}_i \mathrm{perf}(\hat{X}_i), \quad (25)$$

where $N_q$ is the number of samples in the cluster.

EXAMPLE

To illustrate the potential performance of simulated annealing and genetic algorithm as tracking algorithms, experiments corresponding to both good and adverse conditions of surface ship target tracking using simulated active range and bearing measurements were conducted. For comparison purposes, gradient based MLE results are presented. Knowledge of the environmental and sensor models were assumed, and it was assumed that the data have been properly associated and are corrupted by zero mean Gaussian white noise with known variance.

Results are presented as polar scatter plots in both range-bearing and speed-course state spaces. The average error and standard deviation of the error in the estimates were computed for the MLE and simulated annealing estimators. Because the genetic algorithm estimator returns multiple estimates, the cumulative performance values are also plotted as histograms for each of the polar coordinate states.

Figure 7:
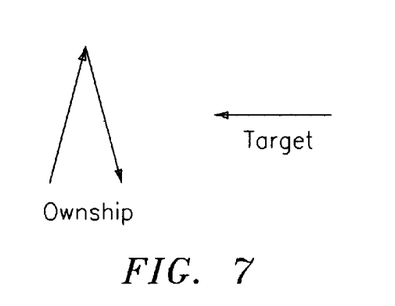
FIG. 7 is a schematic representation of the geometry used in the example set forth in this application.
Figure 8A:
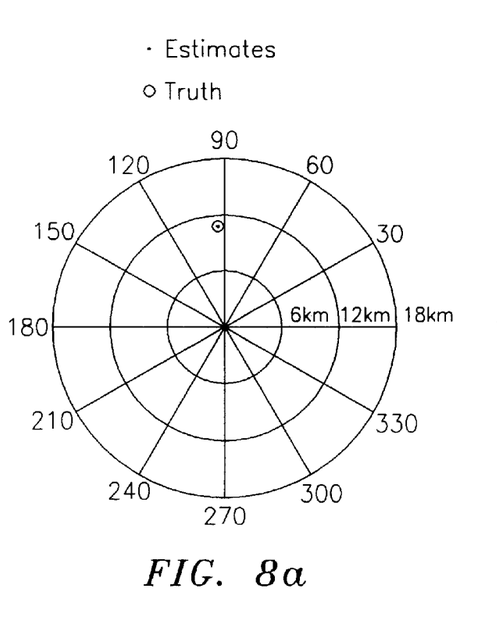
FIG. 8(a) illustrates the range and bearing for an MLE estimate for an 80 sample data set case.
Figure 8B:
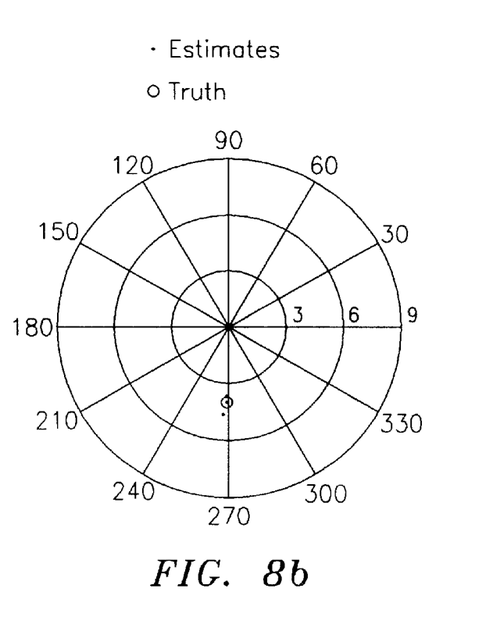
FIG. 8(b) illustrates the speed and course for an MLE estimate for an 80 sample data set case.
Figure 9A:
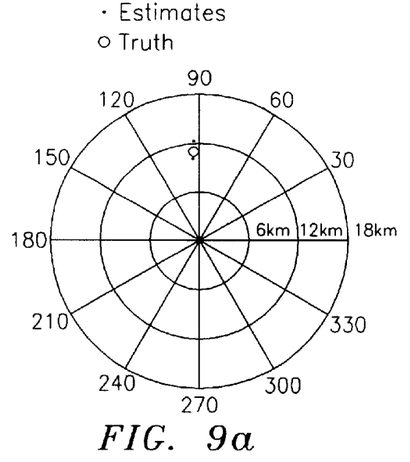
FIG. 9(a) illustrates the range and bearing for simulated annealing estimates for an 80 sample data set case.
Figure 9B:
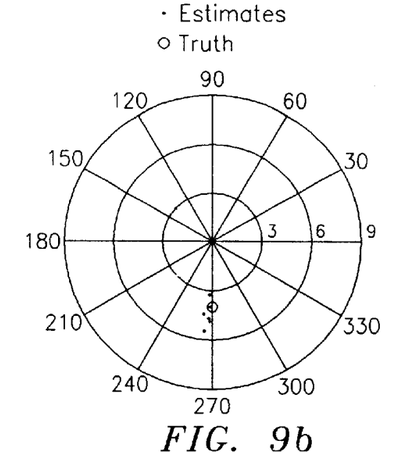
FIG. 9(b) illustrates the speed and course for simulated annealing estimates for an 80 sample data set case.
Figure 10A:
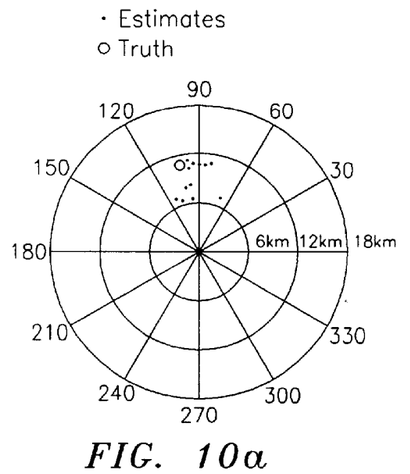
FIG. 10(a) illustrates the speed and course for genetic algorithm estimates for an 80 sample data set case.
Figure 10B:
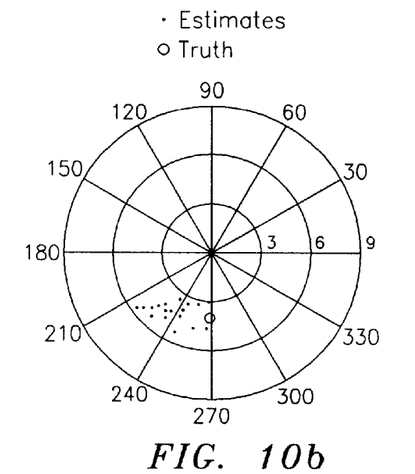
FIG. 10(b) illustrates the range and bearing for genetic algorithm estimates for an 80 sample data set case.
Figure 11A:
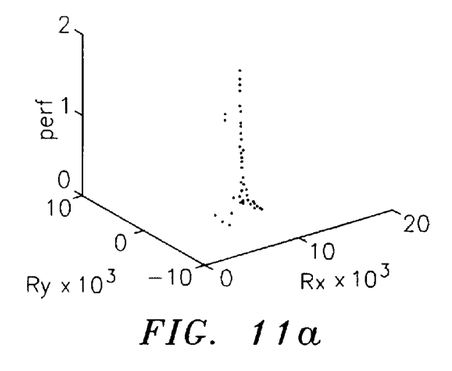
FIGS. 11(a) and (b) illustrate genetic algorithm performance densities with respect to $R_X$ and $R_Y$ and with respect to $V_X$ and $V_Y$, respectively, for an 80 sample data set case.
Figure 11B:
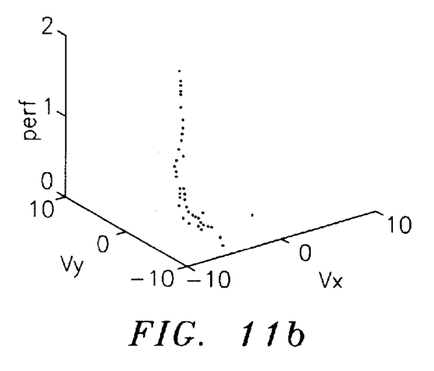
Figure 12A:
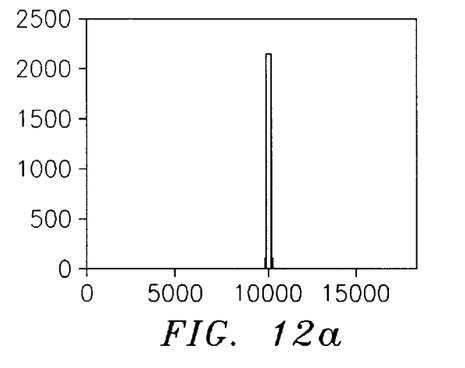
FIGS. 12(a), (b), (c) and (d) illustrate genetic algorithm cumulative range performance, bearing performance, speed performance and course performance, respectively.
Figure 12B:
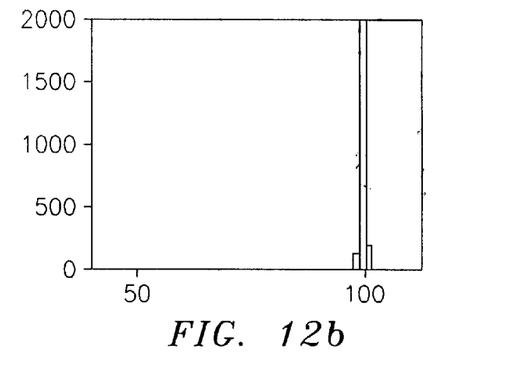
Figure 12C:
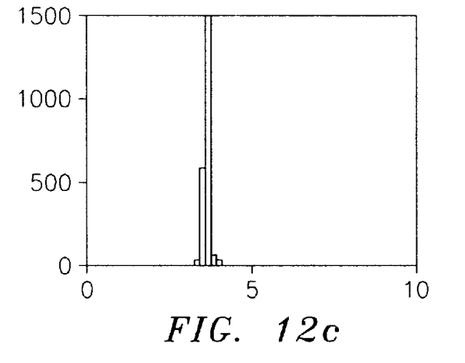
Figure 12D:
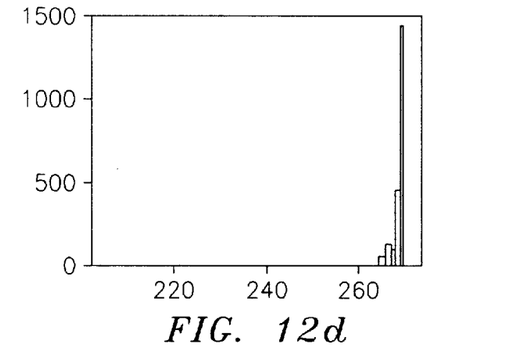
Figure 13A:
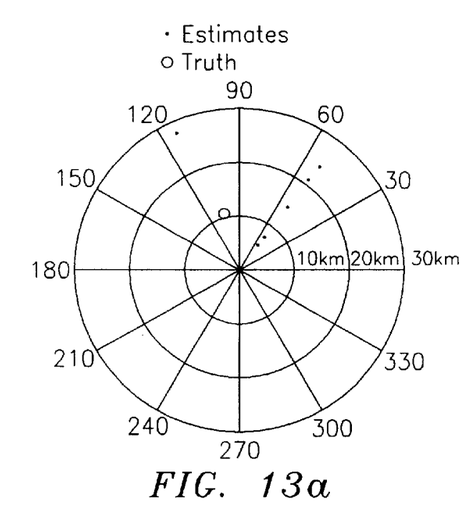
FIG. 13(a) illustrates the range and bearing for an MLE estimate for a 10 sample data set case.
Figure 13B:
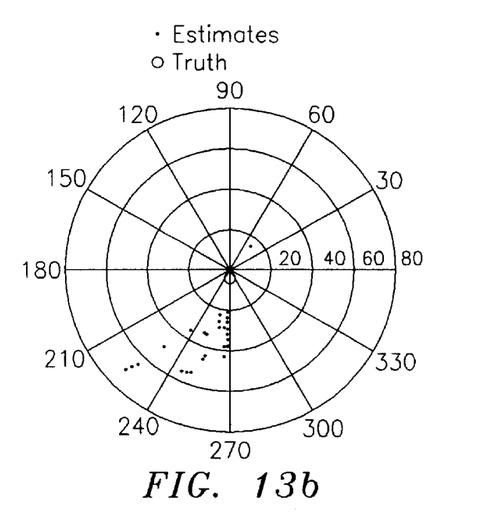
FIG. 13(b) illustrates the speed and course for an MLE estimate for a 10 sample data set case.
Figure 14A:
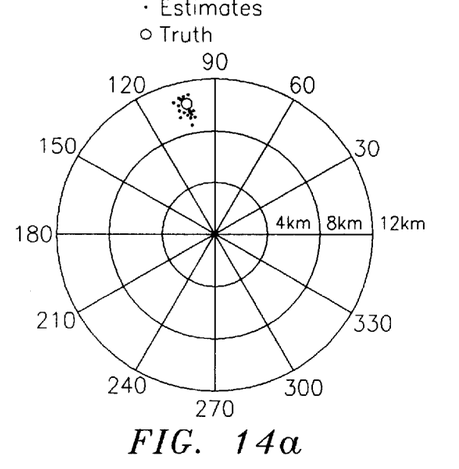
FIG. 14(a) illustrates the range and bearing for a simulate annealing estimate for a 10 sample data set case.
Figure 14B:
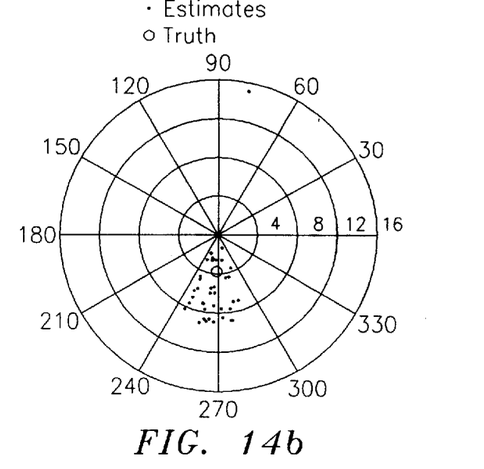
FIG. 14(b) illustrates the speed and course for a simulated annealing estimate for a 10 sample data set case.
Figure 15A:
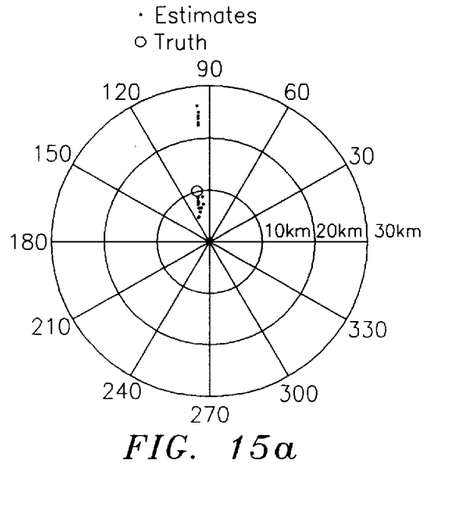
FIG. 15(a) illustrates the algorithm bearing for a genetic algorithm estimate for a 10 sample data set case.
Figure 15B:
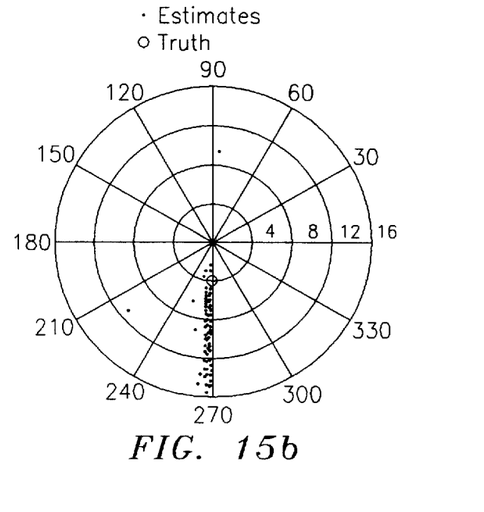
FIG. 15(b) illustrates the speed and course for a genetic algorithm estimate for a 10 sample data set case.
Figure 16A:
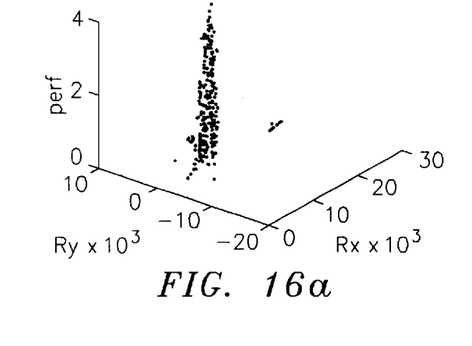
FIGS. 16(a) and (b) illustrate the genetic algorithm performance densities for the 10 sample data set case with respect to $R_X$ and $R_Y$ and with respect to $V_X$ and $V_Y$, respectively.
Figure 16B:
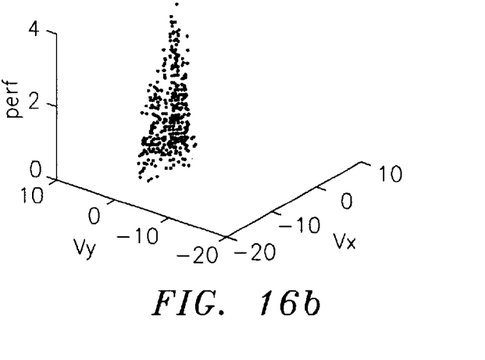
Figure 17A:
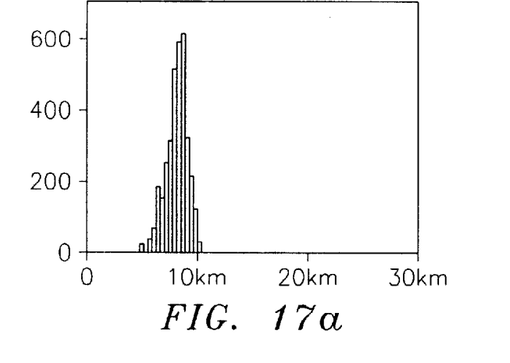
FIGS. 17(a), (b), (c) and (d) illustrate genetic algorithm range cumulative performance, genetic algorithm bearing cumulative performance, genetic algorithm speed cumulative performance, and genetic algorithm course cumulative performance respectively.
Figure 17B:
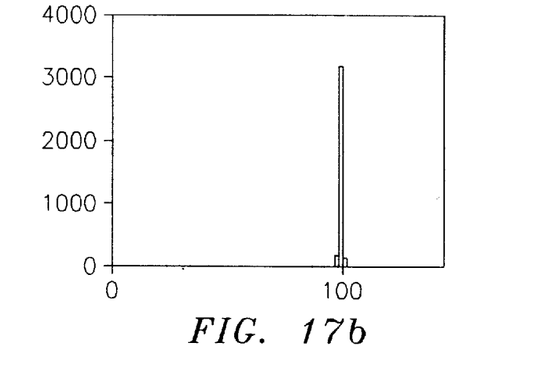
Figure 17C:
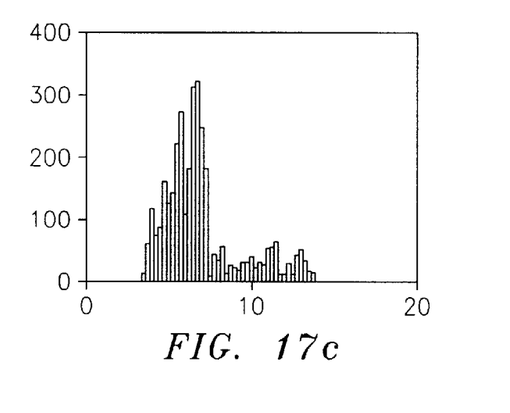
Figure 17D:
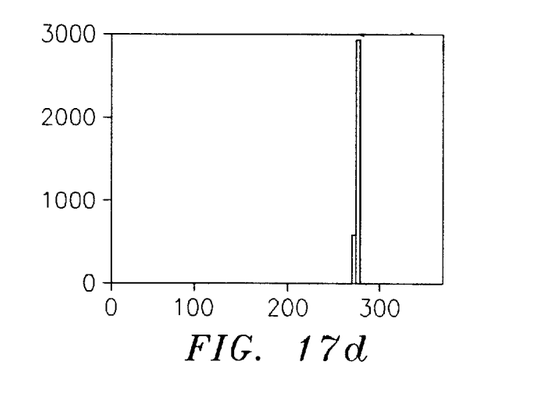

The surface ship geometry used for both experiments is depicted in FIG. 7 and summarized in Table III. The observer starts at the origin and has heading and speed of 26° and 12 knots, respectively. It maintains a constant speed and traverses two twenty-minute legs with an instantaneous course maneuver to 154° at 20 minutes. The target has a constant course of 270° and speed of 8 knots.

TABLE III

| Geometry | Time on leg (min) | Contact Course (deg) | Contact Speed (kts) | Observer Course (deg) | Observer Speed (kts) | Initial Bearing (deg) | Initial Range (km) |
|---|---|---|---|---|---|---|---|
| 80 sample | 20 | 270 | 8 | 26 | 12 | 79 | 20 |
| | 20 | | | 154 | | | |
| 10 sample | 20 | 270 | 8 | 26 | 12 | 79 | 20 |
| | 2.5 | | | 154 | | | |

Monte-Carlo simulations were conducted with 100 noise sequences for cases involving 80-sample and 10-sample data sets with a 32-second sampling period. Active bearing and range measurements were simulated with noise variances of 4.0 $\deg^2$ and 1000 $km^2$, respectively, for the 80-sample scenario, and noise variances of 4.0 $\deg^2$ and $9 \times 10^7$ $km^2$ for the 10-sample geometry. The latter case essentially represents a bearings-only scenario. As such the 80-sample geometry represents a scenario with good observability properties, while the 10-sample geometry represents a scenario with poor observability. It is noted that measurements are only available for the first part of each leg of the 10 sample geometry.

The simulated annealing and genetic algorithm parameters used for these experiments are shown in Tables IV and V respectively. The MLE and simulated annealing estimators are initialized with the measured bearing and range.

TABLE IV

| | |
|---|---|
| $I_T$ | 10 |
| α | 0.94 |
| $T_o$ | 100 |
| $T_{min}$ | $10^{-6}$ |
| $σ^2Rx$ | $10^4$ m$^2$ |
| $σ^2Ry$ | $10^4$ m$^2$ |
| $σ^2Vx$ | 0.01 m$^2$/s$^2$ |
| $σ^2Vy$ | 0.01 m$^2$/s$^2$ |
| # temperatures | 352 |

TABLE V

| | | | | | |
|---|---|---|---|---|---|
| Rxmax | 30 km | Rxmin | −30 km | # bits | 12 |
| Rymax | 30 km | Rymin | −30 km | # bits | 12 |
| Vxmax | 40 m/s | Vxmin | −40 m/s | # bits | 8 |
| Vymax | 40 m/s | Vymin | −40 m/s | # bits | 8 |
| population size | | | | | 34 |
| max # generations | | | | | 352 |
| Probability of crossover | | | | | 99% |
| # crossing sites | initial | 4 | final | | 2 |
| Probability of mutation | initial | 3% | final | | 0.1% |

Results for the 80-sample data set case are illustrated in FIGS. 8 through 12 and Tables VI and VII. This represents a reasonably favorable tracking condition. As such, the MLE results shown in FIGS. 8(a) and (b), and presented in the form of summarizing error statistics in Table VI, indicate that consistent and accurate target solutions are achieved. As can be seen from FIGS. 9(a) and 9(b), and from the data in Table VII containing summarizing error statistics for the plots of FIGS. 9(a) and 9(b), similar performance is realized by both simulated annealing and genetic algorithm tracking algorithms. The results produced by application of the genetic algorithm are shown in FIGS. 10(a)–12(d). It is to be noted that while FIGS. 10(a) and 10(b) show the genetic algorithm estimator appears to have a larger scatter than the MLE or simulated annealing estimators, examination of FIGS. 11(a) and (b) and 12(a), (b), (c) and (d) indicates the scatter is indeed very tight.

TABLE VI

| | Range (km) | Bearing$^{(o)}$ | Course$^{(o)}$ | Speed (m/s) |
|---|---|---|---|---|
| Average Error | −0.008 | −0.07 | −0.08 | −0.04 |
| Standard Deviation | 0.1094 | 0.24 | 1.15 | 0.15 |

TABLE VII

| | Range (km) | Bearing$^{(o)}$ | Course$^{(o)}$ | Speed (m/s) |
|---|---|---|---|---|
| Average Error | −4.156 | −8.26 | −0.88 | −0.16 |
| Standard Deviation | 0.1501 | 1.60 | 1.40 | 0.45 |

Results for the low observability case are shown in FIGS. 13 through 17 and presented in the form of summarizing error statistics in Tables VIII (for MLE) and IX (for simulated annealing). The collapse of the estimates to the origin in FIG. 13(a), and the large errors exhibited in Table VIII are evidence that the MLE has a tendency to diverge under high noise, sparse and intermittent conditions. On the other hand, the plots of the results produced by application of the simulated annealing algorithm to the 10-sample data set in FIGS. 14(a) and 14(b) and Table IX containing summarizing error statistics for the latter plots, and the plots of the results by application of the generic algorithm to the 10-sample data set in FIGS. 15(a)–17(a) show that simulated annealing and genetic algorithm estimates are well behaved and are clustered about the truth.

TABLE VIII

| | Range (km) | Bearing$^{(o)}$ | Course$^{(o)}$ | Speed (m/s) |
|---|---|---|---|---|
| Average Error | −9.127 | −59.3 | −11.9 | 30.8 |
| Standard Deviation | 4.207 | 33.5 | 39.4 | 10.1 |

TABLE IX

| | Range (km) | Bearing$^{(o)}$ | Course$^{(o)}$ | Speed (m/s) |
|---|---|---|---|---|
| Average Error | −0.145 | 1.49 | −11.23 | 0.34 |
| Standard Deviation | 0.664 | 1.9 | 36.9 | 2.8 |

To examine the potential computational efficiency of simulated annealing and genetic algorithms, compare, relative to the conventional grid-search technique, the estimated number of times each algorithm evaluates the performance function to achieve the desired convergence. With a maximum of 2 re-annealings, 10 iterations per temperature update, and 352 temperature changes for the simulated annealing estimator, and with a population size of 34 for 352 populations for the genetic algorithm estimator, the number of performance evaluations is approximately 10,000 and 12,000 respectively. For the standard grid-search technique, if one partitions the states with a 30×30 position and 10×10 velocity grid, and apply 3 passes, with a finer resolution of the same number of grid points for each pass, the number of performance evaluations would be 270,000, or an order of magnitude more computations than simulated annealing and genetic algorithms. It is noted that this is a worst case evaluation and the gain in processing efficiency can be reduced further by optimizing the search parameters of the simulated annealing and genetic algorithms and by applying a more robust stopping criteria.

It is apparent that there has been provided in accordance with this invention a system and method for tracking vehicles using random search algorithms which fully satisfy the objects, means, and advantages set forth hereinbefore. While the invention has been described in combination with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A method for providing an estimate of the state of a contact comprising:

sensing the state of said contact;

generating signals representative of the state of said contact;

processing said signals to arrive at estimates of the state of said contact;

said processing step comprising applying a simulated annealing algorithm methodology to said signals to generate a contact state estimate solution;

said applying step comprising making an initial random guess of said state of said contact;

computing the cost of the contact state estimate;

randomly generating a small change in the contact state estimate;

computing the cost of the new target state estimate;

comparing the new target state estimate against a stopping criteria to determine if said stopping criteria has been met; and changing the simulated annealing temperature if a desired number of iterations has been performed since last temperature update, or incrementing the simulated annealing temperature counter if said desired number of iterations has not been performed.

2. The method according to claim 1 further comprising:

determining the probability of accepting the target state estimate using the following equation:

$$\tau(\hat{X}_{k+1}) = \exp\frac{-\Delta E}{T_j},$$

where $T_j$ is the simulated annealing temperature at the $j^{th}$ simulated annealing temperature iteration and $\Delta E$ is the change in cost; and using a simulated annealing temperature schedule according to the following equation:

$$T_j = \alpha j T_0,$$

where $T_0$ is the initial simulated annealing temperature and $\alpha$ is a constant less than unity.

3. The method according to claim 1 further comprising:

determining if the change in energy is negative; and updating the contact state estimate if said change in energy is negative.

4. The method according to claim 1 further comprising:

determining if the change in energy is negative;

determining the probability of accepting the new contact state estimate if the change in the contact state is not negative;

comparing the probability to a random threshold; and updating the contact state estimate if the probability of accepting the new contact state estimate exceeds said random threshold or returning to said random generating step if the probability of accepting the new contact state estimate does not exceed said random threshold.

5. A method for providing an estimate of the state of a contact comprising:

sensing the state of said contact;

generating signals representative of the state of said contact;

processing said signals to arrive at estimates of the state of said contact;

said processing step comprising applying a genetic algorithm to said signals to generate a contact state estimate;

said application of a genetic algorithm step comprising generating a population having a number of randomly distributed samples of contact state spaces, determining the cost for all of said samples in said population, and comparing the cost of all of said samples to a threshold value to determine if the cost of any one of said samples is less than said threshold value;

determining weighted and normalized performance values for all samples;

selecting parents for crossover;

producing pairs of parents from said selected parents;

performing crossover for said pairs of parents and creating a new generation;

determining the cost of all samples in said new generation;

comparing the cost of all samples in said new generation;

comparing the cost of the samples in said new generation to a threshold value to determine if the cost of any one of the samples in said new generation is below the threshold value and stopping if it is; and constructing a binary representation by concatenating a binary representation of the state variable into a single binary sequence as $$XT_{bi} = [RxT_{bi} RyT_{bi} VxT_{bi} VyT_{bi}],$$

where, for the $i^{th}$ sample, $$\begin{bmatrix} RxT_{bi} \\ RyT_{bi} \\ VxT_{bi} \\ VyT_{bi} \end{bmatrix} = \begin{bmatrix} b_{0_{Rxi}} & b_{1_{Rxi}} & \cdots & b_{k_{Rxi}} \\ b_{0_{Ryi}} & b_{1_{Ryi}} & \cdots & b_{k_{Ryi}} \\ b_{0_{Vxi}} & b_{1_{Vyi}} & \cdots & b_{k_{Vxi}} \\ b_{0_{iVyi}} & b_{1_{Vyi}} & \cdots & b_{k_{Vyi}} \end{bmatrix}.$$

6. The method according to claim 1 further comprising:

computing weighted and normalized performance for the samples if the cost of the samples in said new generation is not below the threshold value; and replacing the original population.

7. The method according to claim 6 further comprising:

performing mutation on said samples in said new generation; and determining the cost for all samples in said new population.

8. A system for providing an estimate of the state of a contact comprising:

means for sensing the state of said contact and for generating signals representative of the state of said contact;

means for processing said signals to generate an estimate of the contact state parameters, said processing means comprising pre-programmed means for applying a simulated annealing methodology to said signals to generate the contact state estimate; and said simulated annealing methodology applying means comprising means for making an initial random guess of the contact state, means for computing the cost of the contact state estimate, means for randomly generating a small change in the contact state estimate, means for computing the cost of the new target state estimate, means for comparing the new target state estimate against a stopping criteria to determine if said stopping criteria has been met, means for changing the simulated annealing temperature if a desired number of iterations has been performed since the last simulated annealing temperature update or incrementing the simulated annealing temperature counter if said desire number of iterations has not been performed, means for determining the probability of accepting the target state estimate using the following equation:

$$\tau(\hat{X}_{k+1}) = \exp\left(\frac{-\Delta E}{T_j}\right),$$

where $T_j$ is the simulated annealing temperature at the $j^{th}$ simulated annealing temperature iteration and $\Delta E$ is the change in cost, and means for generating a simulated annealing temperature schedule according to the following equation:

$$T_j = \alpha j T_0,$$

where $T_0$ is the initial simulated annealing temperature and $\alpha$ is a constant less than unity.

9. A system for providing an estimate of the state of a contact comprising:
   means for sensing the state of said contact and for generating signals representative of the state of said contact;
   means for processing said signals to generate an estimate of the contact state parameters, said processing means comprising pre-programmed means for applying a random search methodology to said signals;
   said pre-programmed means comprising means for applying a genetic algorithm methodology to said signals to generate the contact state estimate; and
   said generic algorithm methodology applying means comprising:
      means for generating a population having a number of randomly distributed samples of contact state spaces;
      means for determining the cost for all of said samples in said population;
      means for comparing the cost of all of said samples to a threshold value to determine if the cost of any one of said samples is less than said threshold value;
      means for determining weighted and normalized performance values for all samples;
      means for selecting parents for crossover;
      means for producing pairs of parents from said selected parents;
      means for performing crossover for said pairs of parents and creating a new generation;
      means for determining the cost of all samples in said new generation;
      means for comparing the cost of the samples in said new generation to a threshold value to determine if the cost of any one of the samples in said new generation is below the threshold value and stopping if it is; and
   constructing a binary representation by concatenating a binary representation of the state variables into a single binary sequence as $$XT_{bi} = [RxT_{bi} RyT_{bi} VxT_{bi} VyT_{bi}],$$

where, for the $i^{th}$ sample, $$\begin{bmatrix} RxT_{bi} \\ RyT_{bi} \\ VxT_{bi} \\ VyT_{bi} \end{bmatrix} = \begin{bmatrix} b_{0_{Rxi}} & b_{1_{Rxi}} & \cdots & b_{k_{Rxi}} \\ b_{0_{Ryi}} & b_{1_{Ryi}} & \cdots & b_{k_{Ryi}} \\ b_{0_{Vxi}} & b_{1_{Vyi}} & \cdots & b_{k_{Vxi}} \\ b_{0_{Vyi}} & b_{1_{Vyi}} & \cdots & b_{k_{Vyi}} \end{bmatrix}.$$

10. The system of claim 8 wherein said processing means comprises means for providing an initial estimate of said contact state parameters.

11. The system of claim 8 further comprising means for checking the consistency of estimated contact state parameters generated by said processing means.

* * * * *